INVENTORS
Kojiro Kinoshita,
Takeo Suzuki &
Shigeki Okajima
BY Webb, Burden, Robinson & Webb United States Patent Office 3,548,338
Patented Dec. 15, 1970

3,548,338
METHOD AND APPARATUS FOR GAS LASER NOISE REDUCTION
Kojiro Kinoshita, Hatano-shi, Takeo Suzuki, Tokyo, and Shigeki Okajima, Nara-ken, Japan, assignors to Shiba Electric Co., Ltd., Tokyo, Japan, a corporation of Japan
Filed Feb. 13, 1968, Ser. No. 705,146
Claims priority, application Japan, Feb. 21, 1967, 42/10,657
Int. Cl. H01s 3/09
U.S. Cl. 331—94.5                                    4 Claims

ABSTRACT OF THE DISCLOSURE

A method and apparatus for gas laser noise reduction by voltage stabilization of the discharge current through negative feedback to the discharge current source of the noise component in the discharge current.

SPECIFICATION

Figure 1:
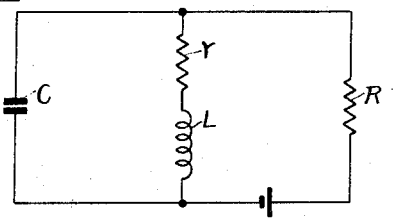

In general, our invention relates to a method and apparatus for the reduction in noise of a discharge current used in an excitation source of a gas laser.

As is well-known, stimulated emission in a gas laser, or other types of lasers, is carried out when an energy exchange occurs between each energy level of the stimulated medium when that medium gains energy from an excitation source. Generally, He-Ne mixture gas is enclosed in a discharge tube and the tube is excited with either a nonpolar discharge from a high frequency electrical source or a direct current discharge across an anode and a cathode that are provided within the discharge tube.

In conventional gas lasers, it is difficult to carry out constant amplitude oscillation since the instantaneous power output of the gas laser fluctuates about the average power output. It has been recognized that output power fluctuations are caused by various factors. These factors include:

(I) the fact that a discharge current used as an excitation source for laser oscillation contains noise components in and of itself;
(II) the fact that a laser resonator changes mechanically;
(III) the fact that there is output interference because of the interference effect resulting from its wave motion characteristic; and,
(IV) the fact that the output involves a shot noise resulting from the photon characteristic.

Heretofore, there has been little, if any, investigatory work done in the area of the output fluctuation and any improvement in gas lasers has not resulted in the elimination of noise. On the other hand, we have done a great deal of research into this area which has resulted in the present invention.

We have analyzed the noise components in the output and the noise components in the excitation discharge current, and have found that there exists an extremely intimate relationship between the former and the latter. As a result, we directed our attention on the latter noise components; that is, the components found in the excitation current. In regard to these components it has been known that there exists two different aspects. One aspect is the component which is distributed over a wide frequency range, several MHz., and the other is the component which intermittently appears at some specially fixed frequency. Furthermore, it has recently become known that the former component (that which distributes in the wide range under several MHz.) is closely related to irregularities in the source current amplitude. However, the characteristic of the component which intermittently appears at some fixed frequency, has not been satisfactorily disclosed. There are two generally accepted theories about this characteristic, namely, that (1) some excess noise has been thought to be discharge modulation noise, or (2) it is the result of the photon bunching effect. We believe that the intermittent component is caused by small oscillation around the average D.C. discharge current level which results in excess noise or discharge modulation noise. More specifically, we regard the small oscillation as a parasitic oscillation which is generated since the discharge tube has a negative incremental resistance.

With our invention we have been able to suppress this noise component caused by the excitation discharge current noise and thereby provide a gas laser system having exceedingly stabilized oscillations. Briefly stated, we provide a means for compensating for the negative incremental resistance we have found existing in the discharge circuit. This is accomplished by the negative feedback of a stabilized voltage to the discharge current source by means of a voltage stabilizing circuit.

The invention will become clearer upon a reading of the specification in connection with the accompanying drawings in which we have shown one preferred embodiment of our invention.

Figure 2:
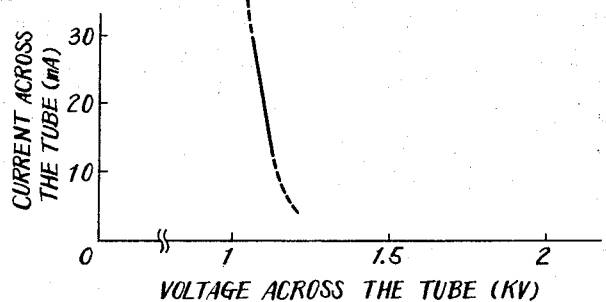
Figure 3:
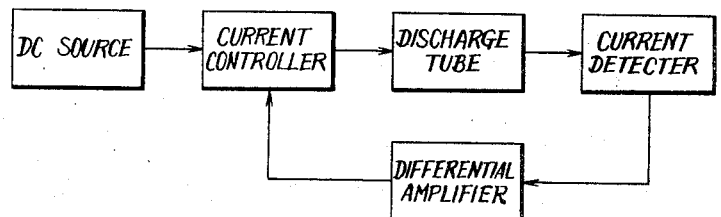
Figure 4:
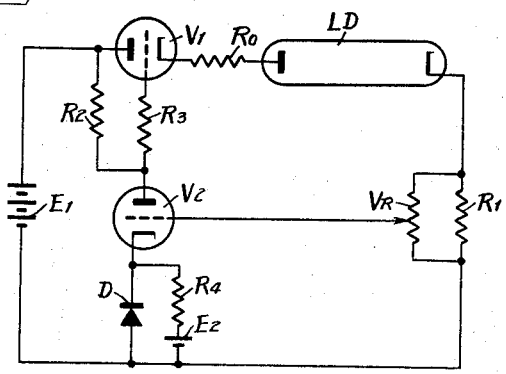
Figure 5A:
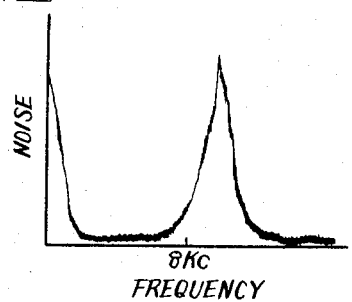
Figure 5B:
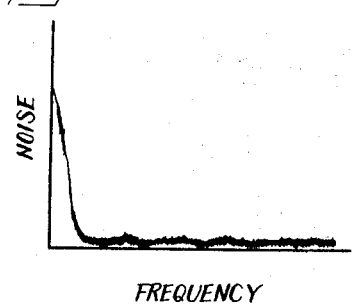

FIG. 1 is an equivalent circuit that explains parasitic oscillation occurring in gas laser systems;
FIG. 2 is a characteristic curve of a discharge tube;
FIG. 3 is an electrical block diagram of our invention;
FIG. 4 is an electrical schematic diagram of this invention; and,
FIG. 5A is a spectrum of laser light in the conventional system; and,
FIG. 5B is a spectrum of laser light in this invention.

Referring to FIG. 1, the parasitic oscillation can be explained by the equivalent circuit shown therein, in which C is a parallel stray capacitance, R is a ballast resistor, L is the series equivalent inductance of the discharge tube. This circuit can be considered as CL resonating closed circuit in which resonance occurs at some fixed frequency, the oscillatory energy resulting from the negative incremental resistance $r$. In this case, the resonating condition, according to Kirchhoff's law, is $L = -CRr$ and the resonating frequency is $$f = (L/C - r^2)^{1/2}/2\pi L$$

wherein $\pi$ is the circular constant.

We have experimentally confirmed the equivalence between the above circuit and the gas laser discharge current. In the first instance, we measured the relation between the electric current and the voltage across the discharge tube, and obtained a characteristic curve shown in FIG. 2. In the experiment, we used an He-Ne mixture gas discharge tube. The length of the discharge was 60 cm., hot cathode, with a pressure of He equal to 0.86 mm. Hg and a pressure of Ne equal to 0.16 mm. Hg, and a multimode operation at 6,328 A. We then measured the frequency of the oscillation current by using the discharge tube. A laser light emitted by the excitation of the discharge tube was detected with a photomultiplier. The output obtained as measured by the detector was analyzed with a spectrum analyzer. As a result, the spectrum showed a sharp resonance at 8 kc./s. In this experiment the inductance L of the tube, parallel stray capacity C and ballast resistor R were 170 mH., 134 pf. and 70KΩ, respectively. By introducing the results of the experiment into the equation for resonance frequency $$(f = (L/C - r^2)^{1/2}/2\pi L)$$

$r$ could be determined. This satisfies the relationship between the electric current and the voltage across the discharge tube.

Consequently, it can be assumed that the main source of the excess noise in the excitation discharge current results from the negative incremental resistance of the discharge tube. Based upon these conclusions, we have succeeded in stabilizing the discharge current to provide an exceedingly stable gas laser system.

FIG. 3 is an electrical block diagram of the preferred embodiment of our invention. This system comprises a direct current source, an He-Ne mixture gas discharge tube, a discharge current detector, a differential amplifier, and a current controller. The discharge current detector is connected in series with the discharge tube for detecting discharge current. The magnitude of the current detected with the detector is compared with a fixed, standard voltage in the differential amplifier, and the difference in current magnitude obtained, which has been amplified to a reasonable magnitude in the amplifier, is negatively fed back to the current controller. Therefore, the discharge current in the discharge tube is kept constant.

FIG. 4 shows an electrical schematic diagram of our invention. $E_1$ is a direct current source, LD is a discharge tube, $R_1$ is a resistor, and $V_R$ is a variable resistor. A circuit including an electric source $E_2$, a Zener diode D, and a resistor $R_4$ supplies current with a fixed, standard voltage. Vacuum tube $V_2$ serves as a differential amplifier and the circuit including resistors $R_3$ and $R_2$ and a vacuum tube $V_1$ controls the electric current. $R_0$ is a ballast resistor.

Discharge current in tube LD is detected with a current detector which has its own resistance $R_1$. The detector current signal after being attenuated to a reasonable level with the variable resistor $V_R$ is fed to a grid in a vacuum tube $V_2$. Current having a fixed, standard voltage is supplied to a cathode of tube $V_2$ from the circuit having the Zener diode. A voltage that is proportional to the current from the variable resistor $V_R$ is compared with the fixed, standard voltage and the difference obtained is amplified in tube $V_2$. The current signal is then fed to a grid $V_1$, and thereby $V_1$, through which electric source current flows, is controlled. Specifically, when the electric current flowing through LD increases, the current $V_1$ is suppressed, since the current from source $E_1$ flows through $R_2$. On the other hand, when the current in LD decreases, the current in $V_1$ increases since the grid voltage in $V_1$ is elevated by the current from $E_1$ through $R_2$ and $R_3$. $R_0$ is a ballast resistor that is generally employed from stabilizing discharge current.

As aforementioned, in this invention, the noise component which has never been suppressed by such a conventional voltage stabilizing circuit, for the discharge curent can be elminated and many exceedingly effective results can be obtained compared with the conventional laser system. The current signal related to the noise component in the discharge current (but not in the laser output) is negatively fed back to the discharge source current and, therefoe, the incremental resistance fo the discharge tube is compensated.

FIG. 5 shows the efficiency of noise reduction by our invention by comparing it with a conventional system. FIG. 5A is a spectrum of laser light noise without the feedback of our invention, and FIG. 5B is the spectrum with the feedback of our invention. As a result of the aforementioned experiment, the signal to noise ratio was found to be improved by more than 40 db.

Another efficiency of our invention is that undesirable noise electromagnetic wave radiated from the laser discharge tube can be cancelled.

While we have described and shown our presently preferred embodiment, it is understood that it may be otherwise embodied within the scope of the appended claims.

We claim:
1. The method of eliminating noise in the output of a laser created by an electrical discharge through a gas lasing medium contained in an optical resonator and suitable for stimulated emission comprising the steps for stablizing the discharge current source over a wide frequency range such that the output noise resulting from fluctuations in the average value of a direct current component of the discharge current and from parasitic oscillations about the average value of the direct current are minimized.

2. The method as set forth in claim 1 including:
   A. detecting the current of said discharge current in said tube;
   B. comparing the voltage component of said detected current with a fixed voltage to obtain a current differential; and,
   C. negatively feeding said current differential to said dischrge current source to thereby stabilize said current of the discharge current source.

3. In a gas laser system, including an optical resonator, a gas medium suitable for stimulated emission, a gas discharge tube for maintaining the gas medium within the resonator, and a current source for passing direct electrical current through the gas to create an electrical discharge therein, the improvement therein for eliminating laser output noise comprising means for detecting fluctuations in the discharge current over a wide frequency range, means responsive to the fluctuations detected for stabilizing the current source such that noise resulting from fluctuations in the average value of a direct current component of the discharge curent and from parasitic oscillations about the average value of the direct current are minimized.

4. The improvement set forth in claim 3 comprising a discharge current detector for voltage detection, a differentional amplifier having a fixed voltage source and connected to said detector for comparing and amplifying a differential signal caused by a differential between the fixed voltage and said detected voltage and a current control means connected between said differential amplifier and said current source such that such control means is responsive to the differential negatively fed thereto.

References Cited
UNITED STATES PATENTS

| | | | |
|---|---|---|---|
| 2,551,407 | 5/1951 | Alder | 323—4 |
| 2,640,962 | 6/1953 | Gray | 323—4 |
| 2,829,334 | 4/1958 | Murnighan | 323—22X |
| 3,258,680 | 6/1966 | Ward | 323—22X |
| 3,395,367 | 7/1968 | Bell et al. | 331—94.5 |

WILLIAM M. SHOOP, JR., Primary Examiner

A. D. PELLINEN, Assistant Examiner

U.S. Cl. X.R.

323—4